Nov. 26, 1935.  A. S. AEGERTER  2,022,452
DIRECTION MEASURING DEVICE
Filed June 19, 1931   2 Sheets-Sheet 1
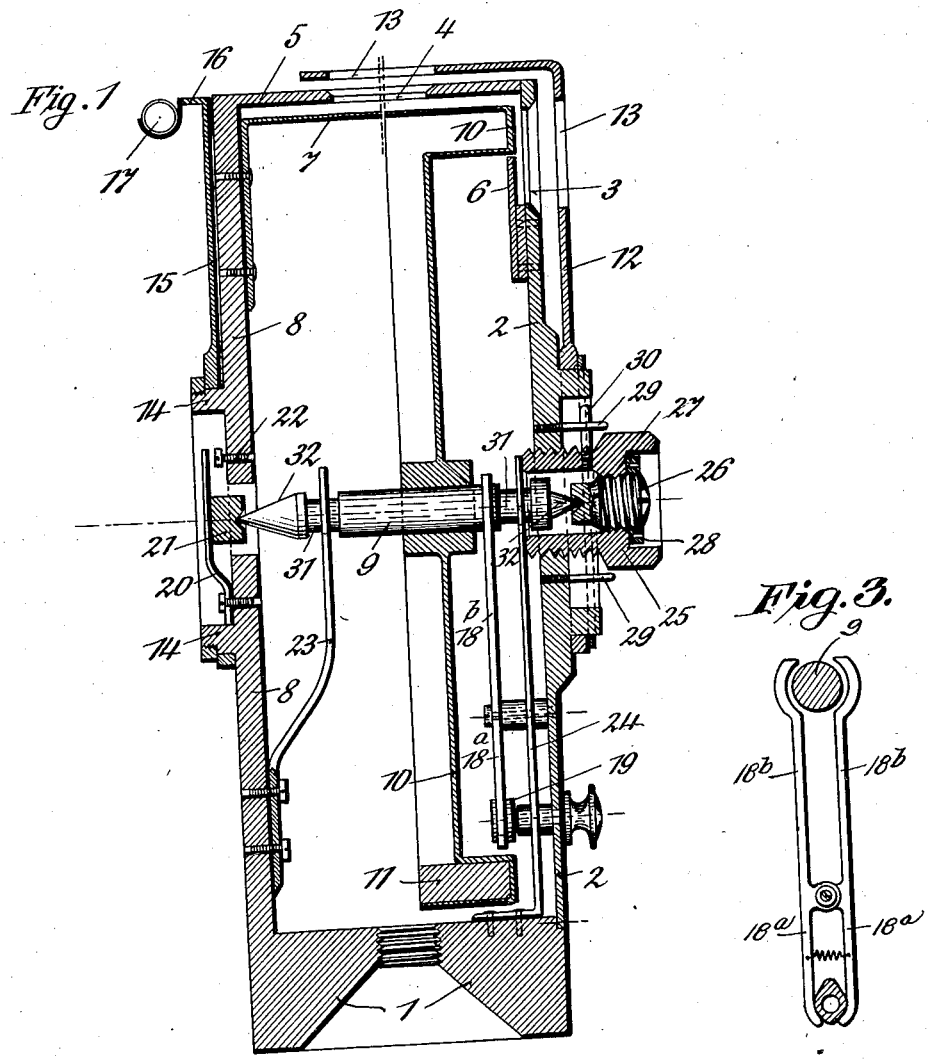
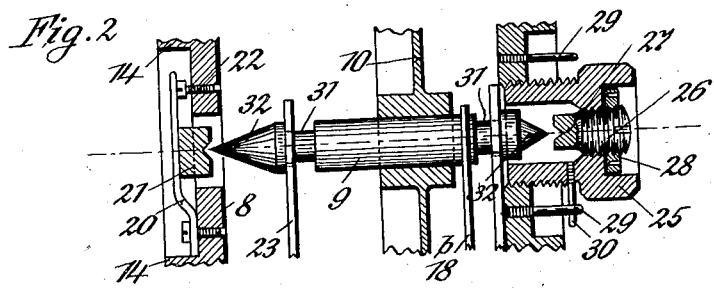
Inventor.
August Samuel Aegerter.

Nov. 26, 1935.  A. S. AEGERTER  2,022,452
DIRECTION MEASURING DEVICE
Filed June 19, 1931  2 Sheets-Sheet 2

Inventor.

Patented Nov. 26, 1935

2,022,452

UNITED STATES PATENT OFFICE 2,022,452

DIRECTION MEASURING DEVICE

August Samuel Aegerter, Basel, Switzerland

Application June 19, 1931, Serial No. 545,524
In France July 21, 1930

4 Claims. (Cl. 33—215.1)

The present invention relates to a direction measuring device for determining inclinations relative to a vertical and horizontal plane.

Instruments of this class, in which a pointer oscillating about an axis and adjustable by gravity is provided which moves over a scale projecting inwardly within a circular mount have been proposed already, but they suffer from the drawback that the scale can be read only from the side. In practical work as, for instance, in building operations, it often happens, however, that the instrument must be used on the ground or even under water, and in such cases it has been found quite inconvenient to determine the angle of inclination, while, according to the invention, an inclination can be determined not only from the side but from the top also. Another defect of all existing types of measuring instruments of this class is that the centers of the shaft gradually, owing to the shaking during transportation, work out their bearings to such an extent that the precision character of the instrument is affected. Bearing nipples for scales, compasses, magnetic instruments and the like, which can be unscrewed during transportation, are known already, but this arrangement provides merely for removing the shaft from its bearings. The novel feature of the present invention, on the other hand, resides in the fact that the shaft, while the bearings are withdrawn, is held by two special spring bearings which carry the shaft and at the same time secure it against lateral displacement.

By way of example, one embodiment of the invention is illustrated in the accompanying drawings, in which Figure 1 is a cross section of the device with the bearings in position and Fig. 2, a partial cross section with disengaged shaft.

Fig. 3 illustrates the clamping device for the shaft.

Figure 4:
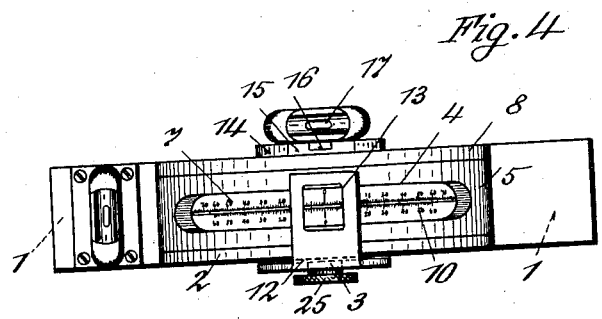
Fig. 4 shows the instrument in top plan view.
Figure 5:
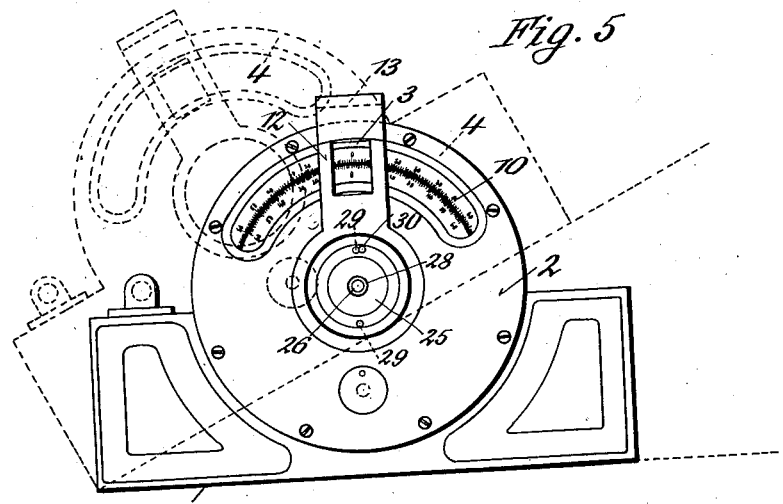
Fig. 5 is a front elevation of the instrument.
Figure 6:
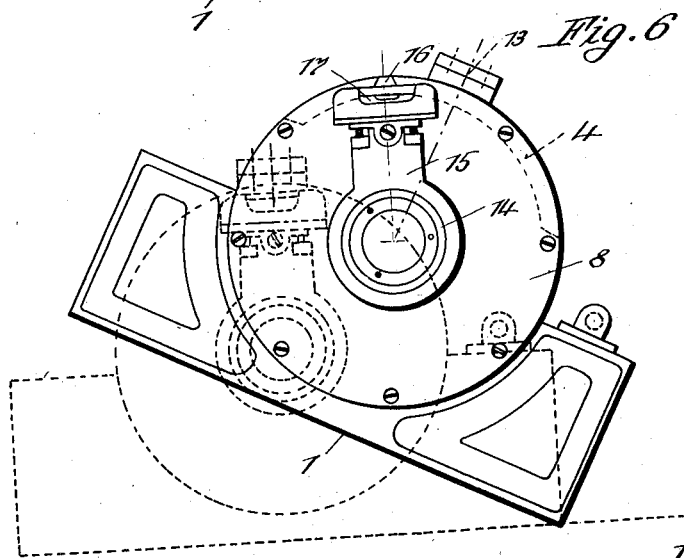
Fig. 6 is a rear elevation showing the instrument adjusted at an inclination.

The casing may be a drum for attachment to another instrument or it may be firmly connected with a channeled base 1 having a threaded bore for attachment to a tripod. The front wall 2 can be removed and has an inspection hole 3, an inspection hole 4 being provided also in the upper portion of the drum casing 5. A scale 6, one half of which extends into the hole 3, is firmly secured to the front wall 2, and a rigid scale 7, one half of which extends into the hole 4, is attached to the rear wall 8. An alidade scale 10, which fills up the remaining halves of the holes 3 and 4 and is provided at its lowest point with the weight 11, is firmly secured to the shaft 9 whose bearings will be described below. For accurate reading, an arm 12 with two reading magnifiers 13 disposed above the scales is provided.

The rear wall 8 carries on the boss 14 an oscillatory arm 15 with the index 16 and the level 17 for adjusting a definite inclination.

For example if a certain inclination or gradient has been set by means of the scales 6 and 10 or 7 and 10 and this inclination is repeatedly required, the level 17 is brought into such a position that it operates in this particular inclination. Thus further inclinations of the same steepness can be set by means of this level 17 without its being necessary to read the scales.

On the inner side of the front wall of the casing a pair of scissors is arranged, having lower arms 18a and upper arms 18b. An eccentric 19 on the inner end of a turnable knob engages between the lower arms 18a of the scissors and spreads these arms asunder if it is turned by means of the knob so that its large portion is in horizontal position. The upper arms 18a are then pressed against the shaft 9 and brake the same. To liberate the shaft 9 the eccentric 19 has to be turned into the inoperative position releasing the lower arms 18a which are then pulled together by the action of a spring so that the upper arms 18b open and move away from the shaft 9.

Now the arrangement of the shaft 9 with its disengaging device will be described. To the rear wall 8 a laminated spring 20 with the point bearing 21 is secured. In front of the upper end of the spring a small set screw 22 is disposed and on the inside of the wall 8 a rigid carrier 23 is positioned while a second resilient carrier 24 is found inside the casing.

Into the front wall 2 a bush 25 with the screwed in nipple 26 is screwed carrying the second point bearing 27. 28 is a check nut for the nipple 26. In the wall 2 two stops 29 are provided and the bush 25 carries the finger 30. In the shaft 9 two journals 31 are provided and 32 are the center heads.

The device is operated as follows:

First the bearing 27 is adjusted by means of the nipple 26 while the check nut 28 is released which is then tightened again. The screwing of bush 25 results via the nipple 26 in pressing off and tensioning of the spring 20 and the carrier 24. The carriers 24, 23 are free within their path 31. The center points are now in position and the spring 20 exerts a slight pressure. When the bush 25 is turned back the spring 20 follows until it rests against the screw 22 and is thus rendered inoperative. This movement of the spring is determined by adjusting the screw 22. Then the spring 24 follows and by engaging the right-hand head 32 draws the shaft 9 along and thus draws the left-hand center 32 from the bearing 21 while the head 32 moves towards the carrier 23. The spring 24 hugs the wall 2 and finally the bearing 27 is drawn off from the right-hand center. The shaft 9 now rests only on the carriers 23, 24 which lock it against longitudinal displacement while the friction between the carriers and heads 32 brakes it against rotation.

The path of rotation of the bush 25 is dimensioned so that the path of the finger 30 between the stops 29 will be sufficient for it.

For disengaging the shaft 9 and its dead centre 32 the hollow screw 25 has to be unscrewed. The carrier 24 which normally bears resiliently against the inner end of the hollow screw 25 moves during the unwinding of this screw towards the inner surface of wall 2 of the casing until it bears against the collar of the right dead centre 32 and shifts the shaft to the right until the base face of the left dead centre bears against the carrier 23. The shaft 9 is thus completely disengaged from the bearings 27 and 21 and held by the carriers or relief bearings 23 and 24.

I claim:—

1. In a direction measuring device for determining angles of inclination, a shaft having bearing portions centrally of the ends thereof, bearings for said shaft mounted in said device for adjustment axially of the shaft to engage or disengage the bearing portions thereof, and auxiliary bearing members one of which is a spring member, mounted in said device in position to carry said shaft when disengaged from said first mentioned bearings and said shaft and auxiliary bearings having cooperating means to protect the shaft against excessive axial displacement, a drum-like casing accommodating the device and having a front and rear wall, a boss attached to the rear wall of said casing, an arm adapted to oscillate on said boss, and an index and level connected with said arm to adjust a certain inclination.

2. In a direction measuring device for determining angles of inclination, a shaft having bearing portions centrally of the ends thereof, bearings for said shaft mounted in said device for adjustment axially of the shaft to engage or disengage the bearing portions thereof, and auxiliary bearing members one of which is a spring member, mounted in said device in position to carry said shaft when disengaged from said first mentioned bearings and said shaft and auxiliary bearings having cooperating means to protect the shaft against excessive axial displacement.

3. In a device according to claim 2 a drum-like casing, a removable front wall in the said casing, there being an inspection hole in the said front wall, a scale firmly secured to the said front wall and extending halfway into the said inspection hole, a rear wall in the said casing, there being an inspection hole in the upper part of the drum-like casing, a scale fixed to the said rear wall and extending halfway into the said inspection hole in the said drum-like casing, a freely oscillating alidade scale on the shaft extending into the remaining halves of the said inspection holes, and a weight attached to the said alidade scale.

4. In a device according to claim 2, in which the auxiliary bearings consist of a leaf spring and a rigid carrier, said device including a casing, a removable front wall for the casing, said shaft having a neck adjacent each end thereof, said spring member and said carrier each having means to engage one of said necks and thereby being adapted to hold said shaft when same is in disengaged position, the said spring elastically pressing outwardly toward one of said bearing portions, and adapted to engage said front wall, when holding the shaft, said bearings serving as a carrier for said shaft and insuring it against excessive axial displacement.

AUGUST SAMUEL AEGERTER.